S. H. Miller,
Governor.
No. 1,285. Reissued Mar. 4, 1862.
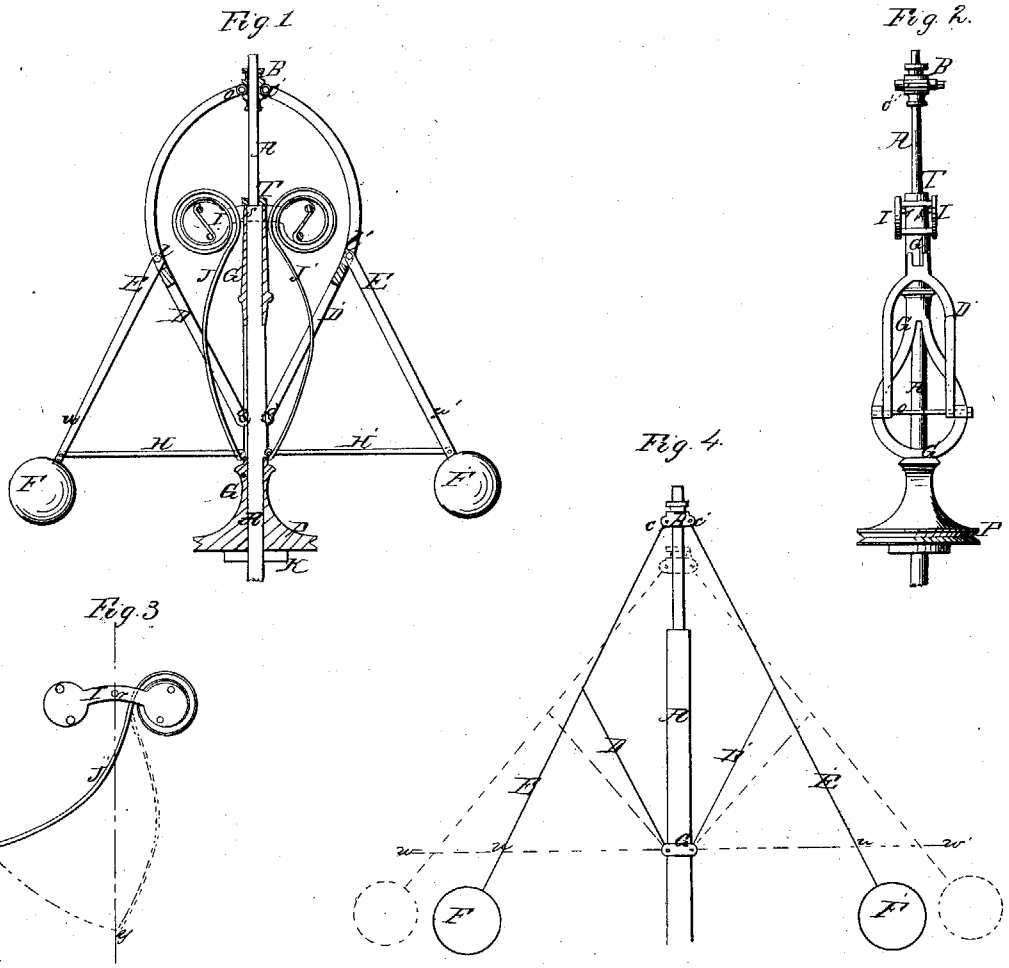
Witnesses
J. W. Crombs
G. W. Reed
Inventor
S. H. Miller
per Munn & Co
attorneys
N. PETERS, PHOTO-LITHOGRAPHER, WASHINGTON, D. C.

UNITED STATES PATENT OFFICE.

S. H. MILLER, OF HANOVERTON, OHIO.

IMPROVEMENT IN GOVERNORS FOR STEAM-ENGINES.

Specification forming part of Letters Patent No. 29,986, dated September 11, 1860; Reissue No. 1,285, dated March 4, 1862.

*To all whom it may concern.*

Be it known that I, S. H. MILLER, of Hanoverton, in the county of Columbiana and State of Ohio, have invented a new and useful Improvement in Governors for Steam-Engines and other Motors; and I do hereby declare that the following is a full, clear, and exact description of the same, reference being had to the accompanying drawings, forming part of this specification.

The object of this invention is to construct a governor for stationary, portable, or marine engines or other motors, the operation of which will not be materially affected by placing its axis in a horizontal or any inclined position, or by the motion of a vessel at sea, on board of which it may be applied; and it consists in a certain system and arrangement of a sliding sleeve, arms, links, and balls, in combination with a spring or springs for producing centripetal force, whereby the desired result is obtained.

In the accompanying drawings, Figure 1 is an axial section of a governor constructed according to my invention. Fig. 2 is a side view of the same at right angles to Fig. 1, omitting the ball, arm, and spring on the nearest side to show the parts behind them. Fig. 3 represents one of the springs and the bar to which it is attached separate from the governor. Fig. 4 is a diagram illustrative of the operation of the governor.

Similar letters of reference indicate corresponding parts in the several figures.

A is the central shaft or spindle of the governor, made stationary, and having fitted to it a long collar or sleeve, G, and a shorter one, B. Both of these sleeves are free to revolve upon the shaft, and the collar B is free to slide longitudinally thereon, but G is confined in a longitudinal direction between the two fixed collars K and T. The sleeve G has formed upon or secured to it a pulley, P, which receives the driving-band through which the governor derives rotary motion from the engine.

E E′ are the ball-arms jointed at *c c′* to the sliding sleeve B, and connected by links D D′ with the sleeve G. The distance in a straight line from the point of connection *l* or *l′* of each arm and its respective link to the point of suspension *c* or *c′* of the arm is equal to the distance between the said point *l* and *l′* and the point of connection *o* or *o′* of the link with the sleeve G, and the distance between the said points *c* and *c′* is equal to the distance between the said points *o o′*. Now let points *u u′* be taken on the arms E E′ in the same straight lines with the points *c′* and *l′*, and at a distance from the points *l* and *l′* equal to the distance between the points *l* and *c′*, *l′* and *c′*, or those *l* and *o*, *l′* and *o′*. It is obvious that these points *u u* will always lie in the same straight line, *w w′*, (see diagram, Fig. 4,) whatever be the position of the balls or sliding sleeve B within their range of motion. The balls F F′ are placed on the arms E E′ on the opposite side of the line *w w′* to that on which the sliding sleeve B is situate, and at a sufficient distance from the points *u u′* to counteract any tendency the sliding sleeve may have to approach or recede from the line *w w′* in consequence of its gravity and the gravity of the movable parts (arms, links, and balls) connected with it, when the shaft A or axis of the governor is in a vertical position. Or the distance of the balls from the points *u u′* may be assumed, and the weight of the balls so adjusted as to produce the above described effect, which may be termed "balancing." It will be seen that when the balls approach or recede from the axis of the governor the sliding sleeve recedes from or approaches the line *w w′*, also that the distance of the sliding sleeve from that line bears a constant ratio to the distance of the balls from the same line. Hence it is evident that if the apparatus is balanced at one point of the range of motion of the sliding sleeve it will be balanced at all points in the range. With this arrangement of the parts and adjustment of the weight of the balls the position of the sliding sleeve upon the axis in no way depends upon the position of the axis itself, and will not be affected by any change in the position of the axis resulting from the motion of a ship at sea; and, moreover, as the balls will vary but little from the same plane of rotation, and as the position of the machine is immaterial, it may be so arranged that the balls rotate near the floor, wall, or ceiling, and hence be less in the way than the ordinary ball-governor. The arms may be both attached to the sliding sleeve by a common joint and the links similarly attached to the main sleeve G, and instead of having the sleeves G and B rotate on the shaft, the shaft may be arranged to rotate, and have the sleeve G fastened to or form a part of the shaft. The advantage of having the shaft fixed and the sleeves rotating upon it is that the sliding sleeve will be less liable to stick in consequence of bad oil or side pressure.

Owing to the balanced condition of the balls, arms, links, and sliding sleeve, hereinbefore explained, it becomes necessary to add, to complete the governor, a means of producing centripetal force to act against the centrifugal force developed in the balls by their revolution, and for this purpose springs J J′ are attached. These springs are coiled at one end and there secured to the opposite ends of a double bar, I, which at the middle of its length is pivoted by pins *r s* to the sleeve G. The other ends of the springs are connected with the arms or balls by rods H H′. Should one of the springs possess or acquire a greater tension than the other, the bar I will thereby be caused to move on its pivots *r s* in such manner as to deviate from its position perpendicular to the line of the axis, and so cause the unwinding of a small portion of one of the springs, while it will wind up a corresponding portion of the other spring, and thereby equalize the pressure exerted by the springs against the balls. The springs should be adjusted to the bar I before it is pivoted to the collar G in such manner that each of them in its normal condition (the other one and the spindle A being out of the way) will cross a line perpendicular to the bar I, and, passing through the center thereof, as illustrated in Fig. 3, and if an exceedingly sensitive governor is required—that is to say, one in which the sliding sleeve B will pass through its entire range of a motion, with a small change in the angular velocity, the distance *z y*, through which the point of the spring must be deflected to bring it to that line, should be nearly equal to the length of the connecting-rod H or H′. For a less sensitive governor the distance *z y* should be less. The reason of this adjustment is obvious from the fact that the distance through which a spring is defected is nearly in proportion to the force applied to it, and that the centrifugal force of the balls is proportioned to their distance from the axis of rotation, the angular velocity being constant.

The regulating-valve may be attached to the slide B in the same manner as to the slide of an ordinary governor, the arrangement of the connections being such that the opening of the valve is reduced by the descent of the sleeve, and vice versa.

I do not confine myself to the use of any form, number, or arrangement of springs; but

What I claim as my invention, and desire to secure by Letters Patent, is—

The employment, in combination with the within-described system and arrangement of sliding sleeve B, arms E E′, balls F F′, and links D D′, of a spring or springs applied to operate, substantially as and for the purpose herein specified.

S. H. MILLER.

Witnesses:
PHILIP J. VOGLESONG,
JOHN J. YATES.